(12) United States Patent
Kuwa

(10) Patent No.: US 8,739,738 B2
(45) Date of Patent: Jun. 3, 2014

(54) PET TOY

(75) Inventor: Nobuhiko Kuwa, Ohta-Ku (JP)

(73) Assignee: Kyoritsu Shokai Ltd., Tokyo (JP)

( * ) Notice: Subject to any disclaimer, the term of this patent is extended or adjusted under 35 U.S.C. 154(b) by 0 days.

(21) Appl. No.: 12/529,968

(22) PCT Filed: Mar. 5, 2007

(86) PCT No.: PCT/JP2007/054227
§ 371 (c)(1),
(2), (4) Date: Sep. 4, 2009

(87) PCT Pub. No.: WO2008/107965
PCT Pub. Date: Sep. 12, 2008

(65) Prior Publication Data
US 2010/0095902 A1 Apr. 22, 2010

(51) Int. Cl.
*A01K 29/00* (2006.01)
*A01K 15/02* (2006.01)
(52) U.S. Cl.
CPC .................... *A01K 15/025* (2013.01)
USPC .......................... 119/707; 119/710
(58) Field of Classification Search
USPC ................. 119/702, 707, 709–711
IPC .................. A01K 29/00,15/02, 5/00
See application file for complete search history.

(56) References Cited

U.S. PATENT DOCUMENTS

| | | | |
|---|---|---|---|
| 5,832,877 A * | 11/1998 | Markham | 119/710 |
| 5,947,061 A | 9/1999 | Markham et al. | |
| 5,965,182 A | 10/1999 | Lindgren | |
| 6,129,053 A | 10/2000 | Markham et al. | |
| 6,186,095 B1 * | 2/2001 | Simon | 119/707 |
| 6,427,634 B1 | 8/2002 | Mann | |
| 6,722,317 B2 * | 4/2004 | O'Rourke | 119/707 |
| 7,144,293 B2 * | 12/2006 | Mann et al. | 446/184 |
| 7,270,085 B2 * | 9/2007 | Wolfe et al. | 119/709 |

(Continued)

FOREIGN PATENT DOCUMENTS

| JP | 1980-10494 U | 1/1980 |
|---|---|---|
| JP | 1983-139070 U | 9/1983 |

(Continued)

OTHER PUBLICATIONS

English Translation of rejections of a Chinese Office Action issued Apr. 20, 2011 in counterpart Chinese Patent Application.

*Primary Examiner* — Rob Swiatek
*Assistant Examiner* — Kathleen Alker
(74) *Attorney, Agent, or Firm* — Harness, Dickey & Pierce, P.L.C.

(57) ABSTRACT

An object of the present invention is to provide a pet toy designed compatibly both to allow cleaning inside the toy as well as introducing and removing the food into/from the pet toy to be performed by a user in a significantly easy manner and to make the animal to be continuously engaged by the toy for a long time.
A pet toy 1 has a flexible and axially flat body formed with a cavity disposed inside thereof that can accommodate an amount of food for an animal. The body comprises: a lateral band portion 3 defining an outer perimeter of an axially central part of the body; a first and a second coverings 4 and 5, each extending in the axial direction from the lateral band portion; and a slit 2 formed in the lateral band portion 3 so as to communicate with the cavity.

13 Claims, 7 Drawing Sheets

(56) References Cited

U.S. PATENT DOCUMENTS

| | | | |
|---|---|---|---|
| 7,320,296 B2 * | 1/2008 | Morrison | 119/707 |
| 7,555,997 B2 * | 7/2009 | Wolfe et al. | 119/707 |
| 2001/0008125 A1 | 7/2001 | Mann | |

FOREIGN PATENT DOCUMENTS

| | | |
|---|---|---|
| JP | 2001-522612 A | 11/2001 |
| JP | 2002-119166 A | 4/2002 |
| JP | 2002-119166 A | 4/2002 |

* cited by examiner (a)

(b)

(c)

(a)

(b)

(a)

(b)

US 8,739,738 B2

PET TOY

CROSS-REFERENCE TO RELATED APPLICATIONS

This application is a 371 U.S. National Stage of International Application No. PCT/JP2007/054227, filed Mar. 5, 2007, the disclosures of which are entirely incorporated herein by reference.

TECHNICAL FIELD

The present invention relates to a pet toy which can hold inside an amount of food for a pet animal, such as a dog and the like.

BACKGROUND ART

While a pet toy designed for a pet animal to play with the pet toy through biting on it has been traditionally known, there is a newly developed pet toy that allows an amount of food for an animal to be held in the pet toy, in order not to make the animal bored. For example, one such pet toy as described in the Patent Literature 1 as noted below comprises a main body member formed to have flexible side walls and an outer surface and a plurality of food capturing recesses arranged geometrically in at least a part of the outer surface. The pet toy with the food held in some of the plurality of food capturing recesses may draw the interest of the animal. Additionally, the Patent Literature 1 describes an embodiment that includes, in addition to the recesses in the outer surface that are not extending through the outer wall thickness, through holes (54 of FIGS. 11, 96 and 98 of FIG. 22, 94 of FIGS. 24, 25 and 26, 106 of FIG. 27, 110 of FIG. 29, 122 of FIG. 35, 124 of FIGS. 36, 94 and 126 of FIG. 37, 128 of FIG. 38, 130 of FIG. 39, etc.) that are formed to extend through the outer wall into an interior of the main body member which is configured to be hollow.

Pieces of food held in those through holes tend to fracture during the animal's playing with the toy, leaving some parts of the food in a cavity inside the toy, as shown in FIG. 24. It may take a long time for the animal to take out the parts of the food left inside, and consequently, during that long time period, the animal can be engaged by the pet toy. However, many of the through holes as described in the Patent Literature 1 are formed to be relatively smaller than those expected from a size of the main body member and geometrically complicated, making it quite difficult for a user to clean up inside the pet toy after use. On the other hand, forming the through holes to be relatively larger than those expected from the size of the main body member, such as 108 of FIG. 28, 114 of FIGS. 31 and 118 of FIG. 33, may facilitate the cleaning inside the toy or refilling the food, but also may allow the pieces of food to get out of the inside space and thus the animal to eat up the food in a short time, meaning that the animal could be hardly engaged by the toy for any longer period. In addition, the through hole 106, 110, which takes the form of slit simply made by boring through the outer wall, is difficult to open wider, because the main body member has a spherical configuration.

The cited Patent Literature 1 has not suggested any such configuration that allows the through hole to be open wider during cleaning and food refilling. Specifically, the invention as described in the Patent Literature 1 is primarily and exclusively designed to make the animal's attention being continuously captured by the toy without any consideration for filling the toy inside space with the food before use or cleaning the toy after use.

[Patent Document 1] Japanese patent application publication No. 2001-522612

DISCLOSURE OF THE INVENTION

Problems to be Solved by the Invention

The present invention has been made in the light of the above fact, and an object thereof is to provide a pet toy having a body formed with a cavity for containing an amount of food and designed compatibly both to allow the cleaning inside the toy as well as introducing and removing the food into/from the pet toy to be performed by a user in a significantly easy manner and to make the animal to be continuously engaged by the toy for a long time.

Means for Solving the Problems

In order to solve the problems as stated above, the present invention provides a pet toy having a flexible and axially flat body formed with a cavity disposed inside thereof that can accommodate an amount of food for an animal, in which the body comprises: a lateral band portion defining an outer perimeter of an axially central part of the body; a first and a second coverings, each extending in the axial direction from the lateral band portion; and a slit formed in the lateral band portion so as to communicate with the cavity.

According to the present invention, during introducing and removing the food into/from the pet toy as well as during cleaning after use, a force is applied from the locations on the lateral band portion proximal to the slit of the pet toy in the longitudinal direction of the slit with use of a user's hand (or fingers and/or thumb). Then, the pet toy made from the flexible material tends to contract in the longitudinal direction of the slit with the force applied thereto, and thus to produce a force affecting in the width direction of the slit so as to expand the slit along the direction of the affecting force. Since the pet toy is generally flat, only a small force applied by the fingers and/or thumb can easily expand the slit in the width direction. Since the slit expanding operation could be hardly done by any other animals than human-beings, the pet toy can successfully inhibit the animals from taking out the food through the slit easily. This helps place the animals to be engaged by the pet toy, while playing with it for a long time.

In the present invention, the lateral band portion and the first and second coverings may be integrally formed. Preferably, the lateral band portion has an axially flat profile. This facilitates the gripping of the pet toy by the fingers and/or thumb, thus improving the easy manipulation, during the expanding operation of the slit. In addition, the lateral band portion may have a substantially circular profile as viewed in the axial direction.

The length of the slit may range between about 25% and about 40% of the full outer perimeter of the lateral band portion. In addition, at least two slits may be formed in the lateral band portion.

In order to increase the volume of the cavity, preferably, each of the first and the second coverings may be formed to be outwardly convex.

In order to facilitate the expanding effect of the slit, preferably, each of the first and the second coverings may be formed of a partial sphere having a solid angle smaller than $2\pi$. Further preferably, each of the first and the second coverings may be made from such a curved surface that allows an angle made by a tangent plane at a boundary between the covering and the lateral band portion with respect to the axial direction to be greater than that when the covering is semi-spherical. In the aspect of the latter, preferably, the angle made by the tangent plane with respect to the axial direction is in a range between 30 degrees and 60 degrees.

In addition, the first covering may have substantially a similar configuration to the second covering. Further, the first and the second coverings have rotationally symmetrical configurations with respect to the axial direction.

In order to further facilitate the expanding effect of the slit, preferably, the body may comprise a thin-walled area having a reduced wall thickness in a region proximal to the slit. In order to securely hold an amount of food to be introduced into the cavity, preferably, the slit may comprise a lip defined by a raise of the wall around the slit.

At least one of the lateral band portion, the first covering and the second covering may have a smell releasing aperture for releasing a smell from the food contained in the cavity. This can encourage the animal to play with the pet toy, while giving the animal a stimulation by way of the smell from the food.

A pet toy according to another aspect of the present invention is characterized in that it comprises a flexible body formed with a cavity disposed inside thereof that can accommodate an amount of food for an animal and a slit formed in the body so as to communicate with the cavity, wherein the body tends to deform itself such that an opening area of the slit can increase, as a force is applied from both ends of the slit in the longitudinal direction of the slit.

BRIEF DESCRIPTION OF THE DRAWINGS

FIG. 2 illustrates the pet toy of FIG. 1, as viewed externally to the pet toy, wherein FIG. 2(a) is a top view, FIG. 2(b) is a side view, and FIG. 2(c) is a front view, respectively;

FIG. 3 illustrates the pet toy of FIG. 1 in a partially cutaway view to show a structure of an outer wall, wherein FIG. 3(a) is a top view, FIG. 3(b) is a side view and FIG. 3(c) is a front view, respectively;

EXPLANATION OF THE REFERENCE NUMERALS

Figure 1:
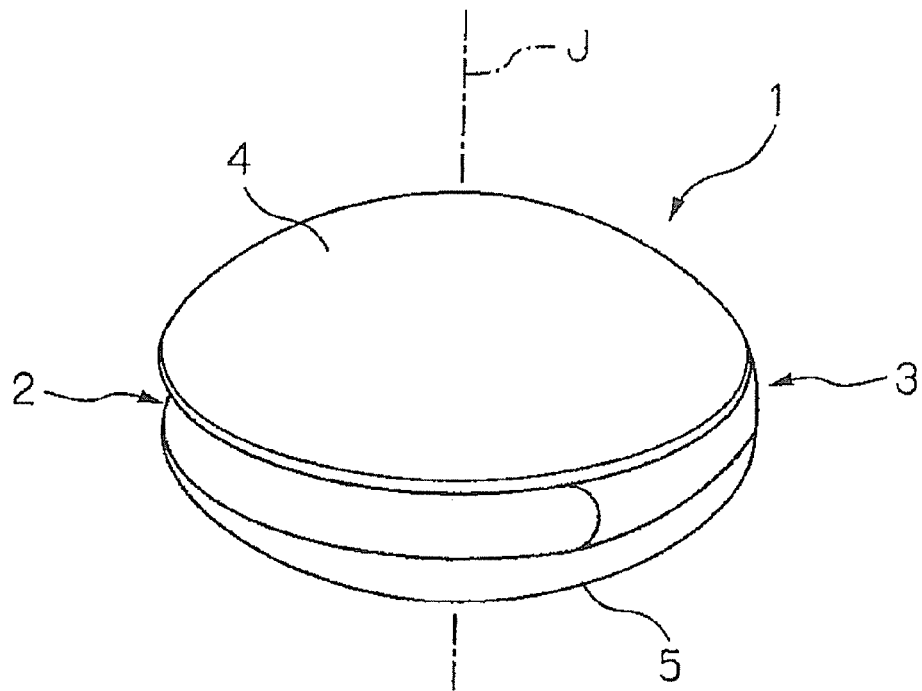
FIG. 1 is a perspective view of a pet toy according to one embodiment of the present invention.

1 Pet toy
2 Slit
3 Lateral band portion
4 (First) Covering
5 (Second) Covering
6 Outer wall
7 Cavity
8 Lip
9 Thin-walled area of a domed surface
10 Thin-walled area of a lateral band portion
20 Animal food
30 A set of smell releasing apertures
32 Smell releasing aperture

EMBODIMENT OF THE INVENTION

With reference to the drawings, an embodiment of the present invention will be described below.

Referring to FIG. 1, a perspective view of a pet toy 1 according to an embodiment of the present invention is shown. The pet toy 1 comprises a body in a flat disc-like configuration in the axial direction, J, as shown in FIG. 1. This body is made of a material having a flexibility that can be flexed and deformed upon application of a force and can return to its original configuration upon removal of the applied force. This material may include an elastomeric material, such as a natural rubber, for example.

The body of the pet toy 1 is formed to include a lateral band portion 3 defining an outer perimeter of a central part of the body in the axial direction J with a first covering 4 and a second covering 5, each in the form of a dome extending in the axial direction J from the lateral band portion 3. The lateral band portion 3 has circumferentially a curvature, but preferably, may be formed so as to be flat with no curvature in the axial direction. In addition, a slit 2 is formed in the lateral band portion 3. Preferably, the length of the slit 2 ranges between about 25% and about 40% of the full perimeter of the lateral band portion 3. In addition, preferably, the flatness of the body (the body height in the axial direction J/the diameter of the body (the lateral band portion 3)) may be between 0.5 and 0.8.

Figure 2:
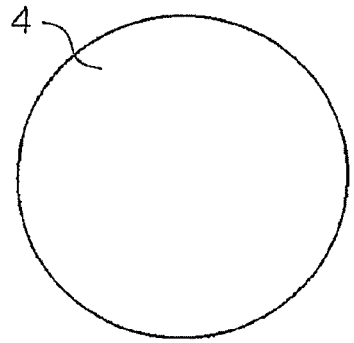
Figure 2:
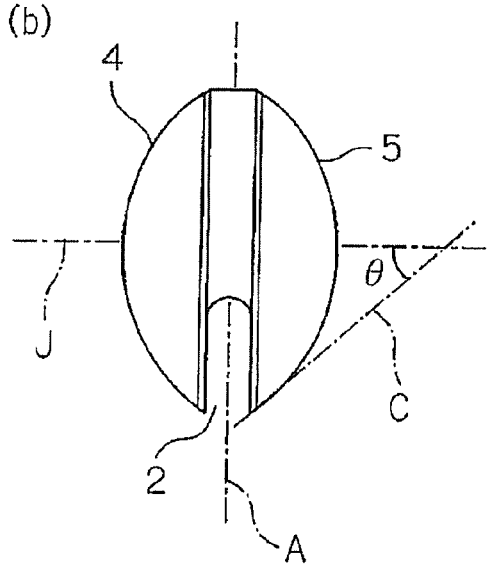
Figure 2:
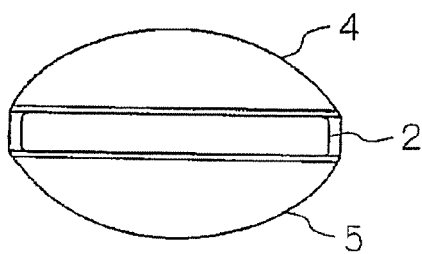

As illustrated in the top view of FIG. 2(a) (the illustration of the pet toy as viewed from the covering 4 side along the axial direction J), preferably, the outer perimeter of the body of the pet toy 1 is formed to be substantially circular and each of the coverings 4 and 5 may be made from an outwardly convexly curved surface, which is configured to define a partial sphere having a solid angle smaller than $2\pi$ in the example as shown in the side view of FIG. 2(b) and the front view of FIG. 2(c). Specifically, each of the coverings 4 and 5 is formed such that an angle, $\theta$, (FIG. 2(b)) made by a tangent plane, C, (FIG. 2(b)) to the covering 4, 5 at a boundary between the lateral band portion 3 and the covering 4, with respect to the axial direction J can be greater than the angle (0 degree) when the covering is semi-spherical (a preferred angle $\theta$ ranging between 30 degrees and 60 degrees). It is to be appreciated that in addition to a part of a perfect sphere, the covering 4, 5 may be a part of a curved surface in any shapes, including, other two-dimensionally curved surfaces, such as an ellipsoid and the like. It is further appreciated that the body of the pet toy 1 is formed to be symmetrical with respect to a plane, A, which is passing through the center of gravity of the body of the pet toy 1 and normal to the axial direction J, as shown in FIG. 2(b).

Figure 3:
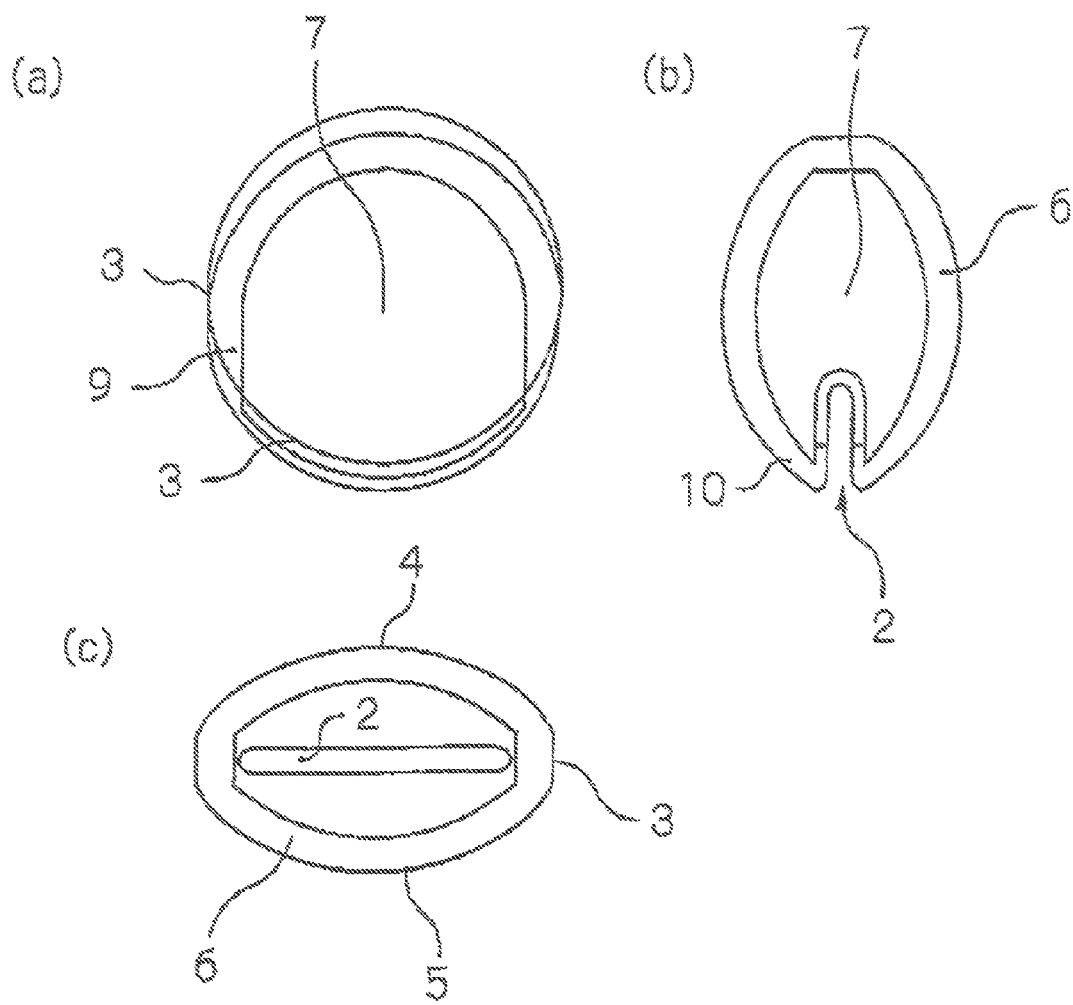

Referring to FIG. 3(a), (b) and (c), an internal configuration of the pet toy 1 is shown. As clearly seen from FIG. 3(b), (c), the body of the pet toy 1 has an outer wall 6, which is configured to enclose a cavity 7. Specifically, the lateral band portion 3 and the coverings 4 and 5 are integrally formed, with each component constructing a part of the outer wall 6. Further, a slit 2 extends through the outer wall 6, and thus the cavity 7 is in communication with the outside through the slit 2.

As shown in FIG. 3(a), the thickness of the outer wall of the lateral band portion 3 in a region proximal to the slit 2 is reduced to define a thin-walled area 9. Additionally, as shown in FIG. 3(b), the thickness of the outer walls of the coverings 4 and 5 in the region proximal to the slit 2 is reduced to define thin-walled areas 9 and 10, respectively. It is also noticed that a lip 8 defined by a raise of the outer wall is provided along the perimeter of cut edge of the slit 2.

Figure 4:
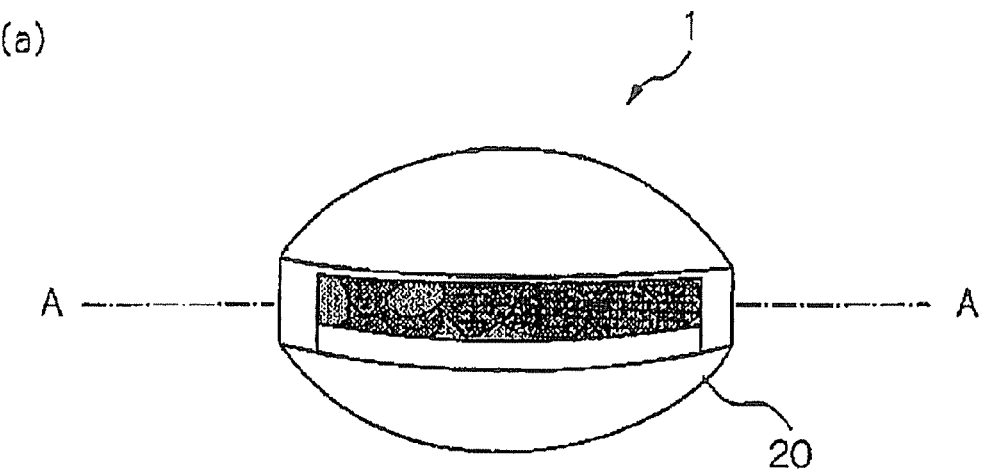
FIG. 4 illustrates the pet toy of FIG. 1 with an amount of animal food contained in a cavity inside the pet toy, wherein (a) is a front view of the pet toy, (b) is a set of drawings, an upper half and a lower half, of the pet toy sectioned along the A-A line.
Figure 4:
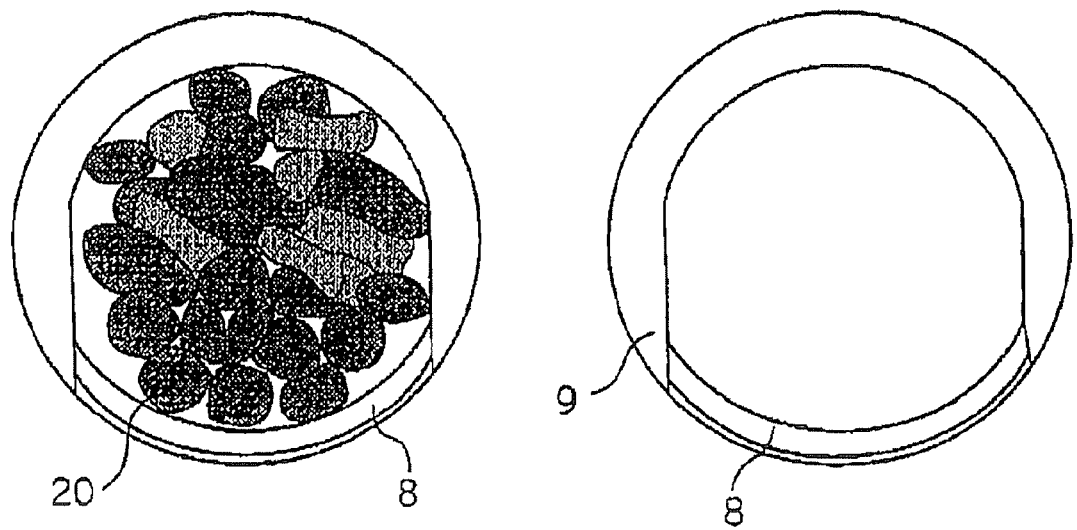

Referring to FIG. 4(a), the pet toy 1 is shown with an amount of animal food 20 contained in the cavity. Further, referring to FIG. 4(b), an upper half and a lower half of the pet toy sectioned along the slit section A-A are shown. It can be recognized from FIG. 4 that the animal food 20 can be packed into the cavity 7.

The operation of the embodiment of the present invention will now be described.

A user may give the pet toy 1 to an animal with an amount of food 20 contained in the pet toy 1 so as to encourage the animal to play with it.

Figure 5:
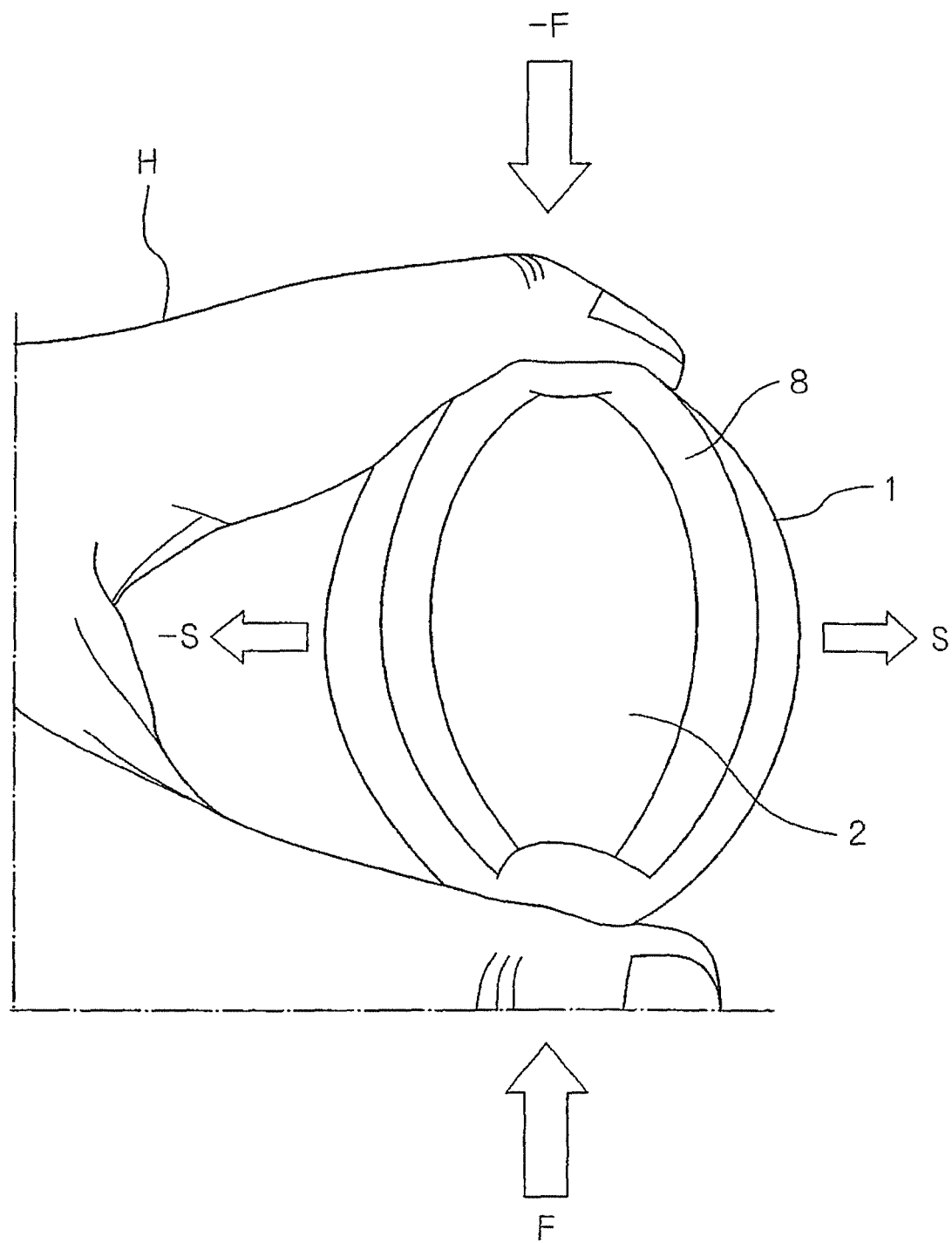
FIG. 5 is an illustration to explain an operation of the pet toy according to an embodiment of the present invention.

During inserting the food into the pet toy 1 and during removing any residual amount of food from the pet toy or cleaning the pet toy after use, a force, F and −F, can be applied to the pet toy 1 from the locations on the lateral band portion 3 proximal to both ends of the slit 2 of the pet toy 1 in the longitudinal direction of the slit as indicated by the arrow with the use of a user's fingers and/or thumb, H, as shown in FIG. 5. Then, the pet toy 1 made of the flexible material tends to contract in the longitudinal direction of the slit, and thus to produce a force, S and −S, affecting in the width direction of the slit 2 so as to expand the slit 2 along the direction of the affecting force, as shown in FIG. 5. Since the pet toy 1, which is generally flat with the covering 4, 5 forming the semi-sphere having the solid angle smaller than $2\pi$, provides fewer parts of the outer wall that can resist against the force affecting in the S and −S directions, therefore only a small force, F, still can expand the slit 2 in the width direction easily. Additionally, since the thin-walled area 9, 10 is provided in the outer wall proximal to the slit 2, the expansion of the slit 2 can be further facilitated. Further, since the lateral band portion 3 is flat with respect to the axial direction, the user can have a better gripping of the pet toy by the fingers and/or thumb, H, and the easy manipulation can be further enhanced.

Figure 6:
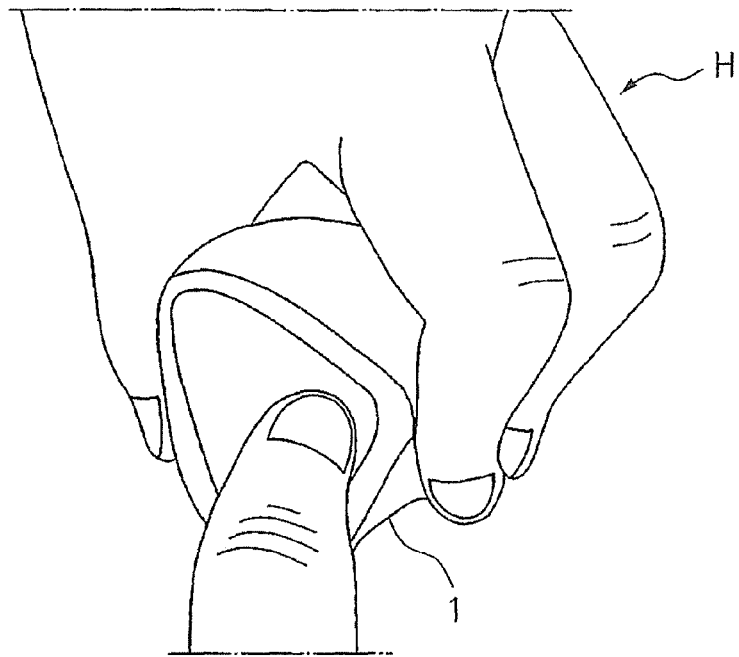
FIG. 6 is a perspective view of a pet toy for illustrating a way to use a pet toy according to an embodiment of the present invention, wherein (a) depicts the pet toy when the food is introduced into it and (b) depicts the pet toy when it is cleaned.
Figure 6:
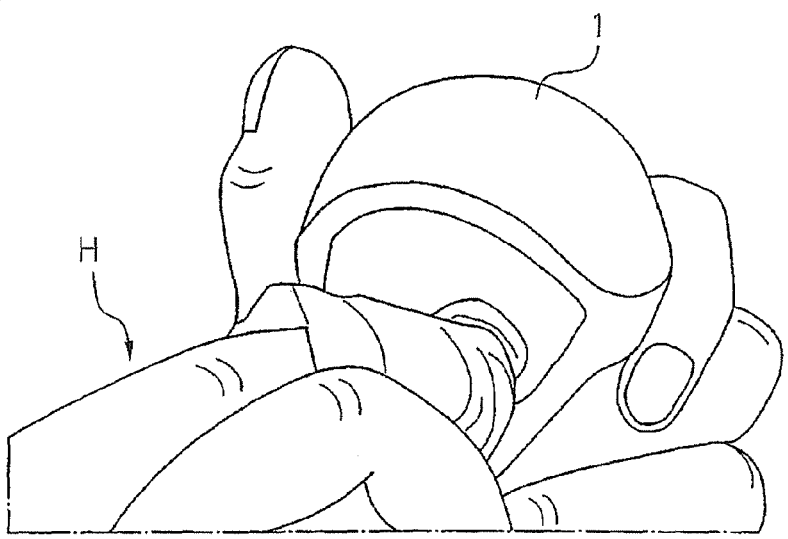

The slit 2, as it can be open widely, provides an easy access by the user to the cavity 7, as shown in FIG. 6(a) by way of example. For example, the introducing and removing the food into/from the pet toy 1 can be significantly facilitated. The cleaning inside the pet toy can be also significantly facilitated, as shown in FIG. 6(b). In addition to those described above, in both cases as illustrated in FIG. 6(a) and FIG. 6(b), since the slit 2 of the pet toy 1 can be expanded only by using one hand, therefore the other hand can be used to do other works, such as those stated above, while one hand engaged in expanding the slit 2.

Further advantageously, since such a slit expanding operation as shown in FIG. 5 could be hardly done by any other animals than human-beings, the pet toy can successfully inhibit the animals from taking out the food through the slit easily. This helps place the animals to be continuously engaged by the pet toy 1, while playing with it for a long time.

Figure 7:
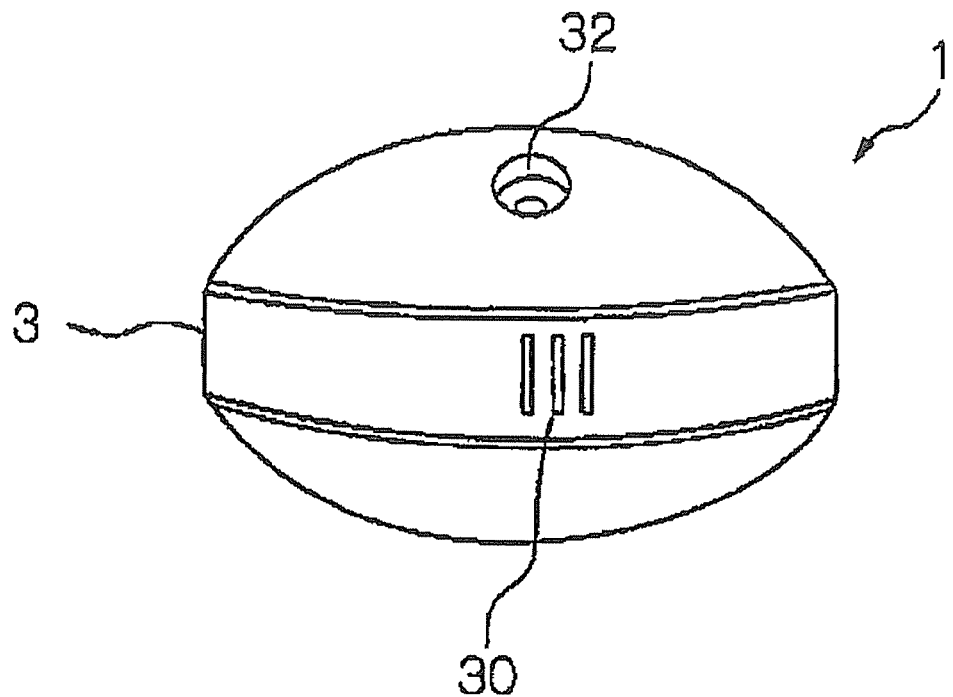
FIG. 7 is a rear view of a pet toy according to another embodiment of the present invention.

It is to be noted that a set of smell releasing apertures 30 for releasing the smell from the food may be disposed at a location substantially opposite to the slit 2 in the lateral band portion 3 of the pet toy 1, as shown in FIG. 7. A smell releasing aperture 32 may also be disposed in at least either one of the coverings 4 and 5. This can encourage the animal to play with the pet toy, while giving the animal a stimulation by way of the smell from the food.

Although the above description has been directed to the embodiments of the present invention, the present invention would not be limited to those but may be desirably and preferably modified within the scope of spirit and concept as defined in the claims.

Figure 8:
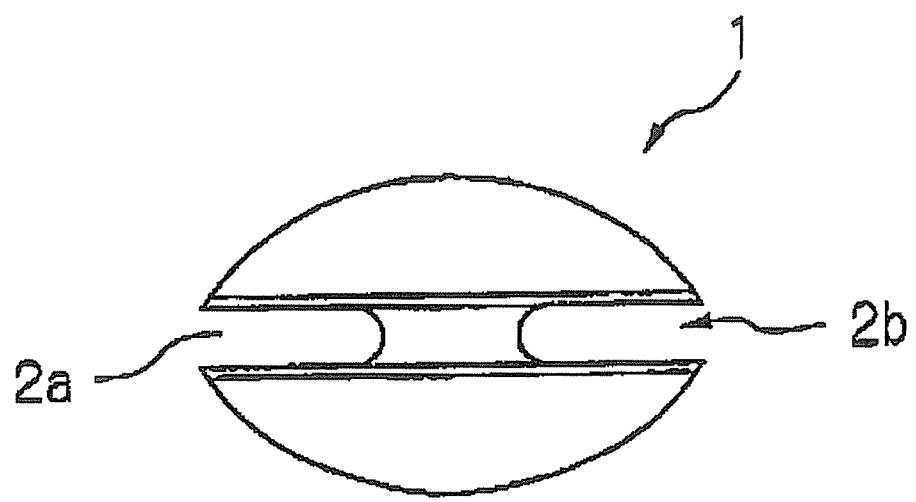
FIG. 8 is a side view of a pet toy according to yet another embodiment of the present invention.

For example, the slit 2 is not necessarily one, but oppositely located slits 2a and 2b may be disposed in the lateral band portion 3, as shown in FIG. 8. It is of course contemplated that three or more slits 2 may be disposed, so far as they would not reduce the effect brought by the invention, such as easy introduction and removal of the food as well as easy cleaning of the pet toy.

Figure 9:
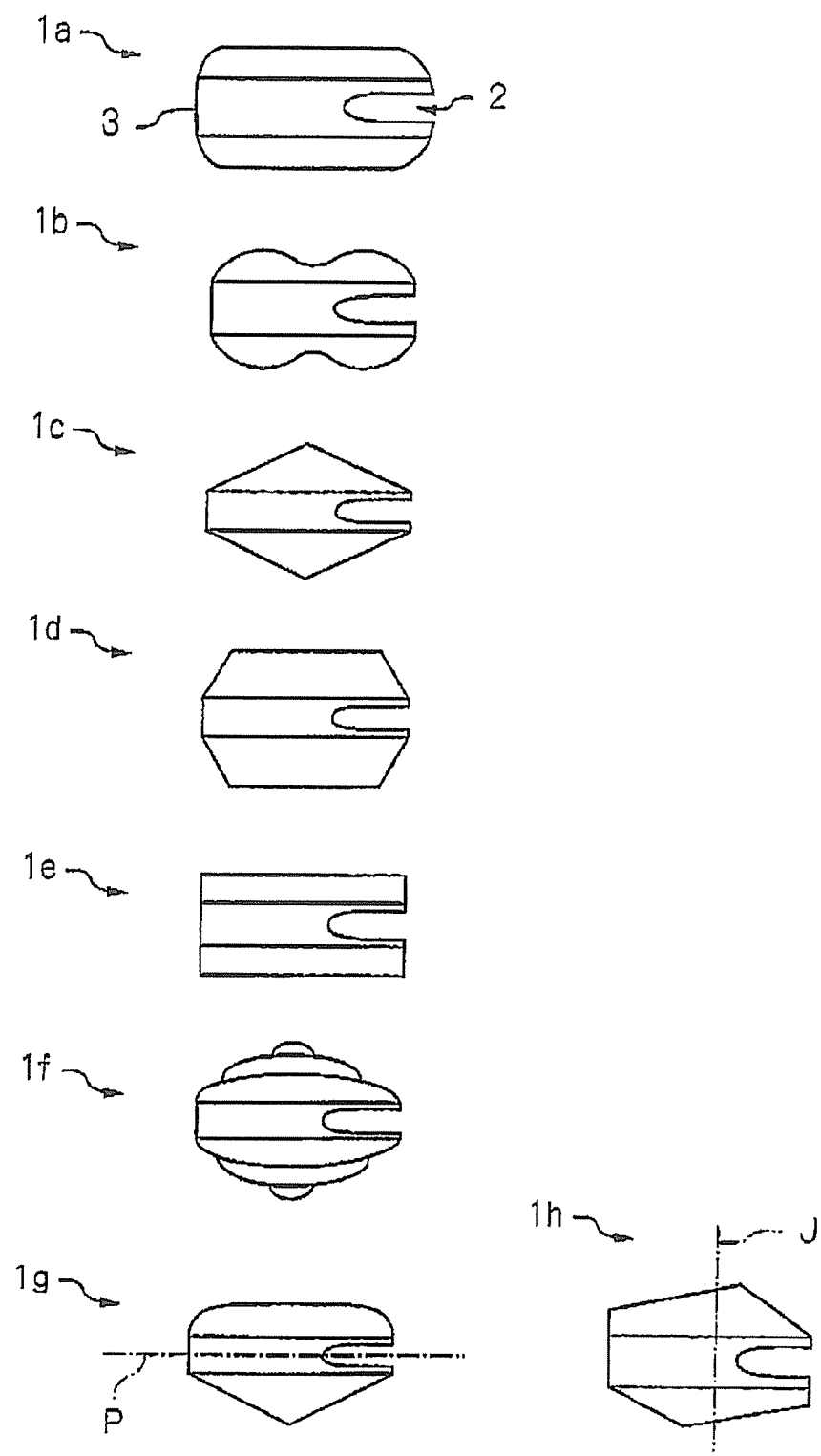
FIG. 9 shows side views of different variations of pet toys according to some embodiments of the present invention.

Further, although the covering 4, 5 is formed of the partial sphere in the embodiments as described above, the present invention would not be limited to those, any preferred configuration may be possible, so far as it allows the slit to be open wide. To name a few, FIG. 9 illustratively presents: Example 1a which includes a flat top of the partial sphere of the covering; Example 1b which includes a concave in the partial sphere of the covering; Example 1c which includes the covering in a conical configuration; Example 1d which includes the covering in a truncated conical configuration; Example 1e which includes the covering in a short cylindrical configuration; and Example 1f which includes the covering in a configuration like smaller buttons placed on larger buttons. In addition, as shown in Example 1g, two coverings are not required to be identically formed (may be formed asymmetrically with respect to the plane P). Further, as shown in Example 1h, the coverings may not be rotationally symmetrical with respect to the axial direction J. Yet further, although the pet toy 1 is circular as viewed in the axial direction J, as shown in FIG. 2(a), the present invention is not limited to that, but may be formed in other shapes, such as polygons. If any polygonal shapes employed, then the covering can also correspondingly take the form of truncated multi-sided pyramid. In this case, the slit(s) may be disposed within one side area or may be formed extending across two or more of sides.

Although the lateral band portion 3 of the pet toy 1, in the embodiment as described above, has a flat profile in the axial direction J, it may take any form of a curved surface smoothly connecting to the covering 4, 5.

The invention claimed is:

1. A pet toy comprising a flexible body formed with a cavity disposed inside that can accommodate an amount of food for an animal, in which said body comprises:
    a flattened shape where an entire length in an axial direction is shorter than an entire length in a radial direction;
    a lateral band portion defining an outer perimeter in the radial direction; a first covering and a second covering, each extending in the axial direction from said lateral band portion;
    a slit formed in said lateral band portion so as to extend in the radial direction and communicate with said cavity;
    first thin-walled areas formed respectively in regions of the lateral band portion proximal to said slit, an outer wall thickness of each of the first thin-walled areas being thinner than an outer wall thickness of any other region of the lateral band portion, and
    second thin-walled areas formed respectively in regions of the first covering and the second covering which are proximal to said slit, and outer wall thickness of each of the second thin-walled areas being thinner than an outer wall thickness of any other region of the first covering and the second covering, wherein the outer wall thickness of the first thin-walled areas and the second thin-walled areas facilitate opening of the slit as a force is applied to opposing ends of the slit in the radial direction.

2. The pet toy in accordance with claim 1, in which said lateral band portion and said first covering and said second covering are integrally formed.

3. The pet toy in accordance with claim 1, in which said lateral band portion has a substantially circular profile as viewed in the axial direction.

4. The pet toy in accordance with claim 1, in which a length of said slit ranges between about 25% and about 40% of the fuller outer perimeter of said lateral band portion.

5. The pet toy in accordance with claim 1, in which each of said first covering and said second covering is formed of an outwardly convex component.

6. The pet toy in accordance with claim 5, in which each of said first covering and said second covering is formed of a partial sphere having a solid angle smaller than $2\pi$.

7. The pet toy in accordance with claim 1, in which each of said first covering and said second covering is made from such a curved surface that allows an angle made by a tangent plane at each boundary between each of said first covering and said second covering and said lateral band portion with respect to said axial direction to be greater than an angle when each of said first covering and said second covering is semi-spherical.

8. The pet toy in accordance with claim 7, in which said angle made by said tangent plane with respect to said axial direction is in a range between 30 degrees and 60 degrees.

9. The pet toy in accordance with claim 1, in which said first covering has a substantially similar configuration to said second covering.

10. The pet toy in accordance with claim 1, in which said first covering and said second covering have rotationally symmetrical configurations with respect to said axial direction.

11. The pet toy in accordance with claim 1, in which said slit comprises a lip defined by a raise of a wall around said slit.

12. The pet toy in accordance with claim 1, in which at least one of said lateral band portion, said first covering and said second covering has a smell releasing aperture for releasing a smell from the food contained in said cavity.

13. The pet toy in accordance with claim 1, in which at least two said slits are formed in said lateral band portion.

* * * * *